United States Patent
Buydens

(10) Patent No.: US 10,809,132 B2
(45) Date of Patent: Oct. 20, 2020

(54) INFRARED SENSOR FOR MEASURING AMBIENT AIR TEMPERATURE

(71) Applicant: Melexis Technologies NV, Tessenderlo (BE)

(72) Inventor: Luc Buydens, Kasterlee (BE)

(73) Assignee: Melexis Technologies NV, Tessenderlo (BE)

(*) Notice: Subject to any disclaimer, the term of this patent is extended or adjusted under 35 U.S.C. 154(b) by 49 days.

(21) Appl. No.: 15/785,779

(22) Filed: Oct. 17, 2017

(65) Prior Publication Data

US 2018/0106681 A1 Apr. 19, 2018

(30) Foreign Application Priority Data

Oct. 19, 2016 (EP) .................................... 16194690

(51) Int. Cl.
*G01J 5/08* (2006.01)
*G01J 5/02* (2006.01)
(Continued)

(52) U.S. Cl.
CPC ........... *G01J 5/0875* (2013.01); *G01J 5/0265* (2013.01); *G01J 5/045* (2013.01); *G01J 5/0887* (2013.01); *G01K 1/18* (2013.01); *G01J 2005/068* (2013.01)

(58) Field of Classification Search
CPC ...................................................... G01J 5/887
See application file for complete search history.

(56) References Cited

U.S. PATENT DOCUMENTS 6,129,673 A * 10/2000 Fraden ...................... G01J 5/04
374/E13.003
6,547,745 B1 * 4/2003 Rubinstein .......... G06F 19/3418
600/549

(Continued)

FOREIGN PATENT DOCUMENTS

KR 20160069501 A 6/2016

OTHER PUBLICATIONS

Extended European Search Report from EP Application No. EP 16194690.0, dated Apr. 28, 2017.

*Primary Examiner* — Clayton E. LaBalle
*Assistant Examiner* — Leon W Rhodes, Jr.
(74) *Attorney, Agent, or Firm* — Workman Nydegger

(57) ABSTRACT

An electronic device for measuring an ambient temperature ($T_{air}$) of the environment of an electronic device is described. It comprises at least one integrated infrared sensor, a blinded window preventing infrared radiation to directly impinge on the integrated infrared sensor and being in thermal contact with the environment as well as with a cover of the device resulting in the blinded window being at a surface temperature ($T_{surface}$). The at least one integrated infrared sensor is adapted for sensing the temperature of the blinded window ($T_{surface}$). The device also comprises at least one absolute temperature sensor for measuring a temperature of the at least one infrared sensor ($T_{sensor}$) itself, and a processing means for determining a temperature difference ($\Delta T$) between the sensed surface temperature ($T_{surface}$) and the temperature of the infrared sensor ($T_{sensor}$) and for calculating based thereon the ambient temperature ($T_{air}$).

15 Claims, 2 Drawing Sheets

(51) Int. Cl.
*G01K 1/18* (2006.01)
*G01J 5/04* (2006.01)
*G01J 5/06* (2006.01)

(56) References Cited

U.S. PATENT DOCUMENTS

| | | | | |
|---|---|---|---|---|
| 6,609,824 | B1* | 8/2003 | Sato | G01J 5/026 374/132 |
| 7,994,928 | B2* | 8/2011 | Richmond | G08B 19/005 340/541 |
| 9,297,330 | B2* | 3/2016 | Svensson | F02D 41/38 |
| 9,816,865 | B2* | 11/2017 | Feyh | F01N 11/002 |
| 9,858,786 | B2* | 1/2018 | Fischer | G01J 5/025 |
| 10,107,214 | B2* | 10/2018 | Fischer | G01J 5/048 |
| 2004/0013159 | A1 | 1/2004 | Raum et al. | |
| 2009/0206264 | A1* | 8/2009 | Twiney | G01J 5/041 250/353 |
| 2012/0081547 | A1* | 4/2012 | Sitzmann | H04N 7/185 348/143 |
| 2014/0355649 | A1 | 12/2014 | Niederberger et al. | |
| 2015/0036719 | A1 | 2/2015 | Koduri | |
| 2015/0219000 | A1* | 8/2015 | Nojiri | G01J 5/0014 250/338.3 |

\* cited by examiner

INFRARED SENSOR FOR MEASURING AMBIENT AIR TEMPERATURE

FIELD OF THE INVENTION

The present invention relates to an infrared sensor for measuring an ambient air temperature. More specifically, the present invention relates to an electronic device comprising an integrated infrared sensor and a method for measuring the ambient air temperature using such a device.

BACKGROUND OF THE INVENTION

A portable electronic device, like a mobile phone, may comprise a temperature sensor. The user can access the data of this temperature sensor, but the latter will only indicate the temperature of the portable electronic device itself, while the user is often more interested in the ambient air or room temperature. Mobile phones have in general quite some internal heating which can vary a lot depending on its use. It is therefore difficult to estimate the ambient temperature of the mobile phone based on the temperature of the mobile phone using this temperature sensor.

Prior art solutions, like e.g. US 2014/0355649, predict the ambient air temperature by logging the history of the temperature of the electronic device and by remembering how the electronic device was used in the past (e.g. how long the device was used, the power consumption, the charging of the battery etc.), if the part was held in the hand or it is was positioned in a pocket. However, these solutions lead to a predicted ambient air temperature and are not accurate.

Therefore, there is a need for a novel method and device for measuring an ambient air temperature of a portable electronic device.

SUMMARY OF THE INVENTION

It is an object of embodiments of the present invention to provide novel methods and device for measuring an ambient temperature of an electronic device.

It is an object of embodiments of the present invention to provide novel methods and device for measuring an ambient temperature of an electronic device using infrared sensors.

The advantage of this method is that one makes a direct, instantaneous measurement of the ambient air temperature. The blinded window surface of the sensor will adjust within seconds to changes in the ambient temperature. This avoids the negative effect of the accumulation of measurement error when integrating measurements over a long time. Using embodiments of the present invention, the past history of the device, e.g. phone, plays no role.

Another advantage is that all sensors can remain internal to the mobile phone, and that it is not necessary to have a thermal probe sticking out of the mobile phone in order to get a measurement of the air temperature.

The above objective is accomplished by a method and device according to the present invention.

The present invention relates to an electronic device for measuring an ambient temperature ($T_{air}$) of the environment of an electronic device, the electronic device comprising:
at least one integrated infrared sensor,
the electronic device comprises a blinded window preventing infrared radiation from the environment of the device to directly impinge on the at least one integrated infrared sensor, the blinded window being in thermal contact with the environment of the electronic device as well as with a cover of the electronic device resulting in the blinded window being at a surface temperature ($T_{surface}$), the at least one integrated infrared sensor being adapted for sensing the temperature of the blinded window ($T_{surface}$),
at least one absolute temperature sensor for measuring a temperature of the at least one infrared sensor ($T_{sensor}$) itself, and
processing means for determining a temperature difference ($\Delta T$) between the sensed surface temperature ($T_{surface}$) of the blinded window and the temperature of the infrared sensor ($T_{sensor}$) itself and for calculating based thereon the ambient temperature ($T_{air}$). The blind window may be part of the at least one integrated infrared sensor or may be separate from it, e.g. being integrated in the cover.

It is an advantage of embodiments of the present invention that an ambient air temperature of an electronic device can be calculated. In embodiments one calculates the temperature of the air surrounding an electronic device, e.g. a portable electronic device like a mobile phone, by using a blinded infrared sensor of which the blinded window surface is in contact with the air.

It is an advantage of embodiments of the present invention that an infrared sensor or thermometer is provided in a cover of an electronic device like e.g. a mobile phone, to determine the air or ambient temperature. In embodiments the infrared sensor will in general not measure the air temperature directly. In embodiments a blinded infrared sensor is used to calculate or determine the air temperature, independent of the electronic device, e.g. mobile phone, temperature. Whereas a mobile phone has been indicated as example of the electronic device, embodiments are not limited thereto and e.g heaters, central heating, temperature control devices, etc. also are envisaged as electronic devices.

The processing means may be adapted for calculating the ambient temperature ($T_{air}$) as a combination of the temperature of the infrared sensor itself ($T_{sensor}$) and a proportional part of the temperature difference ($\Delta T$).

The processing means may be adapted for calculating the ambient temperature ($T_{air}$) as the sum of the temperature of the infrared sensor itself ($T_{sensor}$) and the temperature difference ($\Delta T$).

The absolute temperature sensor for measuring a temperature of the infrared sensor ($T_{sensor}$) itself may be a proportional-to-absolute-temperature (PTAT) temperature sensor, a discrete Negative Temperature Coefficient (NTC) sensor or a temperature sensitive thermistor.

The blinded window may be a metalized optical window or is a metal or plastic sheet.

The electronic device may further comprise a compensator, wherein the compensator is adapted to reduce a difference between a temperature sensor output of the electronic device and the ambient temperature.

The electronic device may be a portable electronic device being selected form a group comprising a mobile phone, a handled computer, an electronic reader, a table computer, a game controller, a pointing device, a photo or a video camera, a digital music player, a wrist watch, a head set, a picture frame and a computer peripheral.

The present invention also relates to a method for measuring an ambient temperature ($T_{air}$) of the environment of an electronic device according to any of previous claims, the method comprising:
sensing the temperature of the blinded window ($T_{surface}$),
measuring a temperature of the at least one infrared sensor ($T_{sensor}$) itself, and
determining a temperature difference ($\Delta T$) between the sensed surface temperature ($T_{surface}$) of the blinded window and the temperature of the infrared sensor ($T_{sensor}$) itself and calculating based thereon the ambient temperature ($T_{air}$).

Calculating the ambient temperature ($T_{air}$) may comprise calculating the ambient temperature ($T_{air}$) as a combination of the temperature of the infrared sensor itself ($T_{sensor}$) and a proportional part of the temperature difference ($\Delta T$).

Calculating the ambient temperature ($T_{air}$) may comprise calculating the ambient temperature ($T_{air}$) as the sum of the temperature of the infrared sensor itself ($T_{sensor}$) and the temperature difference ($\Delta T$).

The present invention also relates to a method for producing an electronic device (1) for measuring an ambient temperature ($T_{air}$) of the environment of an electronic device, the method comprising:

providing at least one integrated infrared sensor in the electronic device and providing a blinded window in the electronic device preventing infrared radiation from the environment of the device to directly impinge on the at least one integrated infrared sensor, the blinded window being in thermal contact with the environment of the electronic device as well as with a cover of the electronic device resulting in the blinded window being at a surface temperature ($T_{surface}$), the at least one integrated infrared sensor being adapted for sensing the temperature of the blinded window ($T_{surface}$), providing at least one absolute temperature sensor for measuring a temperature of the at least one infrared sensor ($T_{sensor}$) itself, and providing processing means for determining a temperature difference ($\Delta T$) between the sensed surface temperature ($T_{surface}$) of the blinded window and the temperature of the infrared sensor ($T_{sensor}$) itself and for calculating based thereon the ambient temperature ($T_{air}$).

The present invention also relates to the use of an electronic device as described above for fever thermometry.

The present invention also relates to the use of an electronic device as described above for controlling room heaters or central heating.

The present invention also relates to the use of an electronic device as described above for controlling car air intake.

Embodiments of the present invention enable calculating ambient temperature of air surrounding an electronical device (e.g. mobile phone) by using a blinded infrared sensor of which the blinded window surface is in contact with the air.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
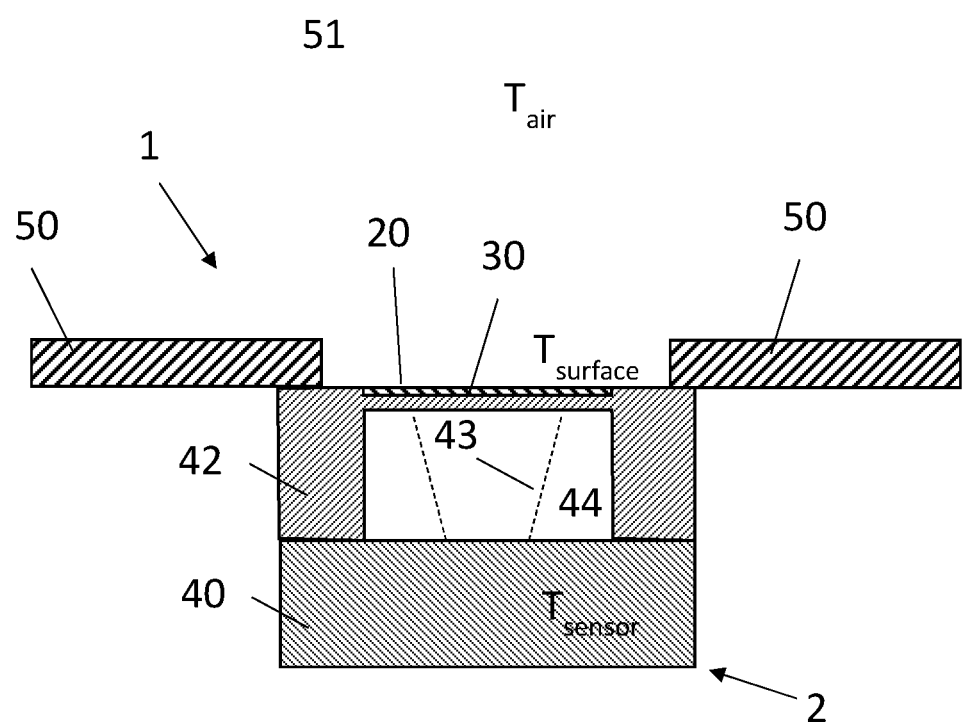
FIG. 1 schematically illustrates a cross-section of a device according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "ambient temperature", reference is made to a temperature of the surrounding environment of a device. In embodiments the ambient temperature of an electronic device refers to the temperature of the air surrounding the electronic device and not the temperature of the electronic device itself.

Where in embodiments of the present invention reference is made to "sensing element"; reference is made to an element which receives a signal, processes it and provides a measurable output. In particular embodiments, the signal refers to electromagnetic radiation in the infrared region, and the sensor may comprise an integrated circuit, a MEMS, a thermopile or similar measuring systems, which are capable to transform the received signal into an electric signal for example a voltage, which may be then transferred to a readable output (for example, a display).

Wherein in embodiments of the present invention reference is made to "cap", reference is made to a cover that protects the sensing element. Some embodiments of the present invention comprise a semiconductor cap, for example silicon or germanium—the invention not being limited thereto. In embodiments of the present invention, the cap may comprise a cavity which isolates the sensing element, which may assist in improving the signal-to-noise ratio. In preferred embodiments of the present invention, the cavity as well as the cap may be tailored according to stringent compositional and geometric conditions so that only radiation under specific conditions may be detected by the sensor. The rest of incident radiation suffers from what is known in optics as total internal reflection (TIR), hence not entering the sensing element and in consequence effectively reducing the field of view (FOV) and shielding the sensor from noise.

Where in embodiments of the present invention reference is made to "infrared radiation", reference is made to radiation in the wavelength range from 1000 nm to 25000 nm, advantageously in the wavelength range from 5000 nm to 20000 nm.

Where in embodiments of the present invention reference is made to "blind infrared sensor", reference is made to sensing elements which may be shielded or otherwise not permitted (or are "blind") to view infrared radiation. In embodiments an optical window, provided in a cap of the sensor or as a separate shield to be used with the sensor, is blocked and prevents infrared radiation from the environment to directly impinge on the sensing element resulting in a blinded window. In other embodiments the cap may comprise materials which do not enable an optical window for sensing infrared radiation also resulting in a blinded window.

In a first aspect the present invention provides a device, as illustrated in FIG. 1. The device 1 is an electronic device. In some embodiments, the device may be a portable electronic device like for example a mobile phone. Nevertheless, other electronic devices also are envisaged, some examples thereof being a temperature controller, a room heater, an airconditioning device, . . . . The device comprises a housing 50, whereby the housing may include a front side with for example a screen and elements like buttons to let a user interact with the device (not shown). The housing also functions as a cover of the electronic device and may further comprise an opening wherein the sensor is provided.

In embodiments of the present invention a blind infrared sensor 2 is provided and is integrated in the cover 50. A blind infrared sensor 2 used in embodiments of the present invention may comprise a cap 42. In embodiments the cover 50 and the blind infrared sensor 2 are two separate elements whereby the blind infrared sensor 2 is integrated in the cover 50, as illustrated in FIG. 1. In alternative embodiments the cap 42 of the blind infrared sensor 2 is part of the cover 50, e.g. where the blind infrared sensor 2 and cover 50 are providing as a single element (not shown). In this specific embodiment the cover 50 is preferably made locally thin or having a low thermal mass such that it reacts quickly to external temperature changes.

In embodiments additional patterning, reflecting elements, coatings and/or absorbing elements or coatings, or a combination of them, may be added to an optical window of the cap (not forming the interface with a cavity 44), in particular the upper outside surface of the optical window of the cap. The area of the surface comprising such patterned, absorbing, and/or reflecting features may be a defined area of the cap surface which is exposed to the source radiation and in thermal contact with the environment 51. For example, the optical window provided in the cap may be metallized on the upper outside surface of the cap resulting in a blind infrared sensor 2 comprising a blinded window 20.

In alternative embodiments a blind infrared sensor is enabled by replacing the optical window in a cap 41 by a metal or plastic sheet or membrane 30 resulting in a blinded window 20. Examples of materials used are anodized aluminum or polycarbonate plastic. In further embodiments, alternative materials may be used for the upper surface of the cap which prevent or block infrared radiation directly impinging on the infrared sensor 2. The blinding shield thus may be either provided in the cap, in the cover, in the cap being part of the cover or even at another position.

For example, as illustrated in FIG. 1, the blind infrared sensor 2 may comprise a cap 42, wherein the cap 42 comprises an infrared blocking material 30 resulting in a blinded window 20, wherein the blinded window 20 and thus cap is in contact with the cover 50. In addition, the cap 42 comprising the blinded window 20 is in contact with sensing element 40 of the blind infrared sensor 2. The sensing element 40 of the blind infrared sensor 2 may comprise, in addition to a detector chip, an absolute calibrated temperature sensor (not shown) to measure the temperature of the blind infrared sensor itself $T_{sensor}$. A suitable absolute calibrated temperature sensor may for example be proportional-to-absolute-temperature (PTAT) temperature sensors. A PTAT is a specific type of temperature sensor and it's the design commonly used in a chip that measures its own temperature. Other suitable temperature sensors may for example be discrete Negative Temperature Coefficient (NTC) sensors or a plain temperature sensitive thermistor.

In the embodiment illustrated in FIG. 1, the blind infrared sensor 2 may be a blind infrared sensor 2 comprising at least one wall 43 oriented to induce total internal reflection (TIR) such that radiation is reflected away from the sensor instead of being transmitted into the cavity 44. Although a blind infrared sensor comprising at least one wall 43 is illustrated, the presence of at least one wall 43 is not necessary to carry out embodiments of the present invention and other blind infrared sensors known in the art may be used. An alternative blind infrared sensor may be a discrete infrared thermopile sensor (not shown), wherein the thermopile sensor is not blinded as such but is looking at a separate blinded window 20.

In preferred embodiments the outer layer or front surface of the blinded window 20 of the blind infrared sensor 2 is in thermal contact with the outside air 51 and does not generate heat by itself. As the blinded window 20 is in contact with the cover 50 and the rest of the infrared sensor 2, its temperature ($T_{surface}$) will be in between the air temperature of the environment ($T_{air}$) and the blind infrared sensor temperature ($T_{sensor}$), which is sensed by the absolute calibrated temperature sensor, depending on the thermal resistance between the cover 50 and the air 51 and between the cover 50 and the blind infrared sensor 2 and electronic device 1.

Figure 2:
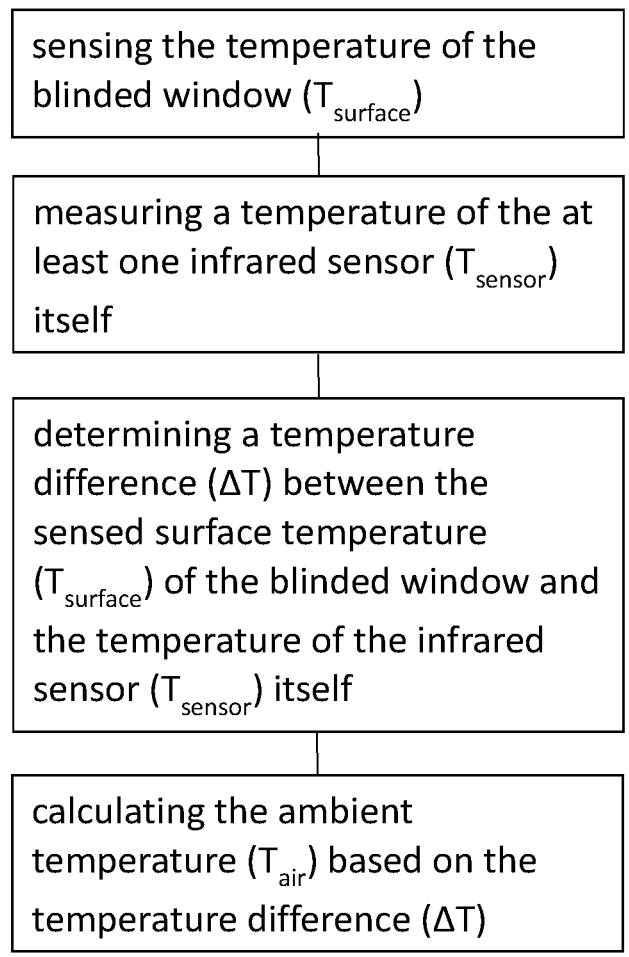
FIG. 2 illustrates a flow-chart of method for measuring ambient air temperature according to embodiments of the present invention.

The blind infrared sensor will pick up or sense the infrared radiation coming from the front surface of the blinded window 20 of the cap 42 ($T_{surface}$) and based on that the temperature difference between the front surface ($T_{surface}$) and the internal temperature of the sensor itself ($T_{sensor}$) can be determined or calculated ($\Delta T$). This temperature difference ($\Delta T$) will depend on the temperature difference between the integrated infrared sensor (and the electronic device) and the air in front of the front surface of the sensor. This can be expressed in the following relation:

$$(T_{air}-T_{sensor})=A\times(T_{surface}-T_{sensor})=A\times(\Delta T)$$

with A presumed a constant, although A might depend on the air pressure, but normal atmospheric pressure variations may cause only neglectible differences. The ambient temperature $T_{air}$ can then be calculated as a combination of the temperature of the infrared sensor itself ($T_{sensor}$) and a proportional part of the temperature difference ($\Delta T$) which is also illustrated in the flow-chart of FIG. 2:

$$T_{air}=A\times(T_{surface}-T_{sensor})+T_{sensor}=A\times(\Delta T)+T_{sensor}$$

One could also choose to use two absolute calibrated temperature sensors to measure both the surface and sensor temperature itself and subtract those from each other. However, in that case, both absolute sensors have to be very precise to be able to measure the small temperature difference between the surface and the internal temperature accurately. However, if one uses a blind infrared sensor according to embodiments of the present invention, the infrared measured signal is directly proportional to the difference $T_{surface}-T_{sensor}$ and this difference ($\Delta T$) will be zero when Tsurface=Tsensor. This is a major advantage for accuracy and long term reliability.

In further embodiments of the present invention the device may comprise a compensator adapted to perform a dynamic compensation based on the determined ambient temperature of the environment of an electronic device. The compensator corrects a temperature value as directly measured to compensate for effects of the surrounding of the sensor inside the portable device or external to it. In other words, once the ambient temperature has been established using an embodiment of the present invention, this information may be used to dynamically adjust a directly measured temperature value, e.g. by applying a calibration, so as to compensate for effects of the surrounding of the sensor inside the electronic device or external to the electronic device.

In embodiments the present invention may be used to determine whether a change in temperature is influenced by a change in the environment or handling of the mobile device.

In embodiments the present invention may be used for fever thermometry where the ambient temperature is an input factor used to calculate a body temperature.

In further embodiments of the device additional environmental parameters may be determined. The device according to embodiments of the present invention may comprise several sensors. These sensors can for example be a touch sensitive screen, one or more microphones, a brightness sensor, etc. In addition, the blind infrared sensor itself can provide at least a supporting measurement used with other measurements when attempting to interpret changes in the environment.

Whereas embodiments of the present invention has been described with reference to a mobile phone, it is to be noticed that the method and systems can be used in each application where there is a need for obtaining or knowing the true air temperature. Some example applications are: Electric heaters used for warming up a room typically only have sensors that measure the temperature of the heater itself, while what they want to regulate is the room temperature. Consequently, there is a real need there to know the air temperature. The system according to embodiments of the present invention provide an air temperature sensor thus allowing a more precise control is possible. Another example is central heating. In such systems, the reference temperature is often the temperature of the controller on the wall. This temperature is however mainly the temperature of the wall, while one wants to know the temperature of the air. With an air temperature sensor, again a more precise control is possible. A last example is the intake of air in a vehicle, e.g. a car. The car air intake temperature is important for the operation of the engine and correct control allows to reduce the car exhaust. Therefore a fast measurement of the air temperature is preferred, which is possible with this sensor.

The invention claimed is:

1. An electronic device for measuring an ambient temperature of the environment of an electronic device, the electronic device comprising:
   at least one integrated infrared sensor,
   a blinded window preventing infrared radiation from the environment of the electronic device to directly impinge on the at least one integrated infrared sensor, the blinded window being in thermal contact with the environment of the electronic device as well as with a cover of the electronic device resulting in the blinded window being at a surface temperature, the at least one integrated infrared sensor being adapted for sensing the temperature of the blinded window,
   at least one absolute temperature sensor for measuring a temperature of the at least one infrared sensor itself,
     wherein the surface temperature of the blinded window depends on the thermal resistance between the cover and the environment and between the cover and the integrated infrared sensor, the surface temperature of the blinded window being between the ambient temperature and the temperature of the at least one infrared sensor, and a processor configured to determine a temperature difference between the sensed surface temperature of the blinded window and the temperature of the infrared sensor itself and for calculating based thereon the ambient temperature.

2. The electronic device of claim 1, wherein processor is programmed for calculating the ambient temperature as a combination of the temperature of the infrared sensor itself and a proportional part of the temperature difference.

3. The electronic device of claim 1, wherein the processor is programmed for calculating the ambient temperature as the sum of the temperature of the infrared sensor itself and the temperature difference.

4. The electronic device according to claim 1, wherein the absolute temperature sensor for measuring a temperature of the infrared sensor itself is a proportional-to-absolute-temperature temperature sensor, a discrete Negative Temperature Coefficient sensor or a temperature sensitive thermistor.

5. The electronic device according to claim 1, wherein the blinded window is a metalized optical window or is a metal or plastic sheet.

6. The electronic device according to claim 1, further comprising a compensator, wherein the compensator is adapted for, based on the determined ambient temperature, adjust a directly measured temperature value of the at least one infrared temperature sensor, so as to compensate for effects of surroundings of the sensor inside or external to the electronic device.

7. The electronic device according to claim 1, wherein the electronic device is a portable electronic device being selected form a group comprising a mobile phone, a handled computer, an electronic reader, a table computer, a game controller, a pointing device, a photo or a video camera, a digital music player, a wrist watch, a head set, a picture frame and a computer peripheral.

8. A method for measuring an ambient temperature of the environment of an electronic device of claim 1, the method comprising:

sensing the temperature of the blinded window, measuring a temperature of the at least one infrared sensor itself, and determining a temperature difference between the sensed surface temperature of the blinded window and the temperature of the infrared sensor itself and calculating based thereon the ambient temperature.

9. The method of claim 8, wherein calculating the ambient temperature comprises calculating the ambient temperature as a combination of the temperature of the infrared sensor itself and a proportional part of the temperature difference.

10. The method of claim 8, wherein calculating the ambient temperature comprises calculating the ambient temperature as the sum of the temperature of the infrared sensor itself and the temperature difference.

11. A method for producing an electronic device for measuring an ambient temperature of the environment of an electronic device, the method comprising:

providing at least one integrated infrared sensor in the electronic device and providing a blinded window in the electronic device preventing infrared radiation from the environment of the device to directly impinge on the at least one integrated infrared sensor, the blinded window being in thermal contact with the environment of the electronic device as well as with a cover of the electronic device resulting in the blinded window being at a surface temperature, the at least one integrated infrared sensor being adapted for sensing the temperature of the blinded window, providing at least one absolute temperature sensor for measuring a temperature of the at least one infrared sensor itself, and providing a processor configured to determine a temperature difference between the sensed surface temperature of the blinded window and the temperature of the infrared sensor itself and for calculating based thereon the ambient temperature.

12. A method for measuring an ambient temperature of an environment of an electronic device, the method comprising:

providing the electronic device, the electronic device including at least one integrated infrared sensor, a blinded window that prevents infrared radiation from the environment of the electronic device to directly impinge on the at least one integrated infrared sensor, the blinded window being in thermal contact with the environment of the electronic device as well as with a cover of the electronic device resulting in the blinded window being at a surface temperature, the at least one integrated infrared sensor being adapted for sensing a surface temperature of the blinded window, at least one absolute temperature sensor for measuring a temperature of the at least one infrared sensor itself, and a processor; and sensing the surface temperature of the blinded window;

sensing the temperature of the infrared sensor itself;

wherein the surface temperature of the blinded window depends on the thermal resistance between the cover and the environment and between the cover and the integrated infrared sensor, the surface temperature of the blinded window being between the ambient temperature and the temperature of the at least one infrared sensor, determining with the processor of the electronic device a temperature difference between the sensed surface temperature of the blinded window and the temperature of the infrared sensor itself; and calculating with the processor the ambient temperature based on the determined temperature difference between the sensed surface temperature of the blinded window and the temperature of the infrared sensor itself.

13. The method of claim 12, further comprising performing fever thermometry wherein the ambient temperature is an input factor used to calculate a body temperature.

14. The method of claim 12, further comprising controlling a room heater or central heating based on the measured ambient temperature.

15. The method of claim 12, further comprising controlling a car air intake based on the measured ambient temperature.

* * * * *